United States Patent [19]

Aoi

[11] Patent Number: 4,641,157

[45] Date of Patent: Feb. 3, 1987

[54] IMAGE DISPLAY DEVICE

[75] Inventor: Shigeru Aoi, Yokohama, Japan

[73] Assignee: Canon Kabushiki Kaisha, Tokyo, Japan

[21] Appl. No.: 560,839

[22] Filed: Dec. 13, 1983

[30] Foreign Application Priority Data

| | | | |
|---|---|---|---|
| Dec. 20, 1982 | [JP] | Japan | 57-222123 |
| Dec. 20, 1982 | [JP] | Japan | 57-222124 |
| Dec. 20, 1982 | [JP] | Japan | 57-222125 |

[51] Int. Cl.[4] .................. G01D 15/14

[52] U.S. Cl. .................. 346/160; 355/5

[58] Field of Search .................. 346/160, 74.2, 150; 400/119; 358/300, 301; 355/5, 15, 16; 101/DIG. 13; 340/715, 716, 700, 753–755

[56] References Cited

U.S. PATENT DOCUMENTS 3,641,585 2/1972 Hodges .................. 346/74.2

OTHER PUBLICATIONS

IBM Image Disclosure Bulletin, "Traveling Display Tube", by Engel, vol. 11, No. 5, Oct. 1968, p. 504.

*Primary Examiner*—Arthur G. Evans
*Attorney, Agent, or Firm*—Fitzpatrick, Cella, Harper & Scinto

[57] ABSTRACT

An image display device has an image display window, an endless photosensitive belt, an image exposure unit, a semiconductor laser oscillator, developing equipment, an optical system, and a sequence controller. When a power-OFF switch is depressed, the current display image on the belt is erased first and then power is cut off. When the operator accidentally forgets to erase an image, the sequence controller automatically erases the image to allow protection of confidential data. However, a previous image can be redisplayed within a predetermined time after erasure of this image.

10 Claims, 11 Drawing Figures

FIG. 6A
FIG. 6
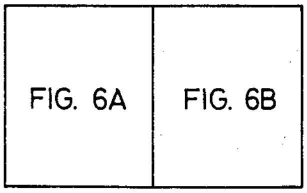
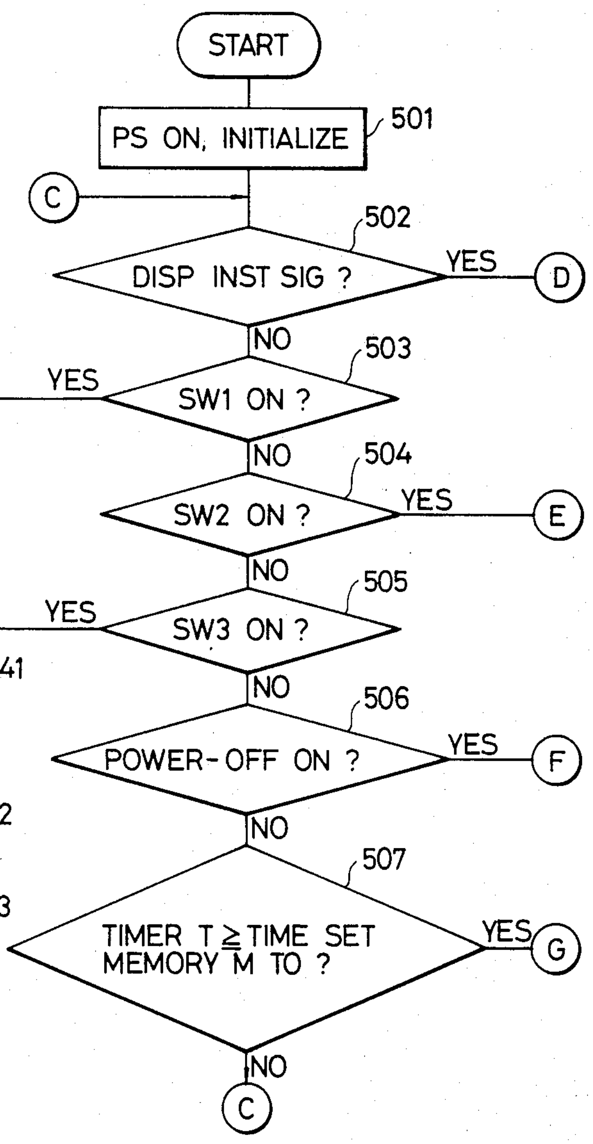

IMAGE DISPLAY DEVICE

BACKGROUND OF THE INVENTION

1. Field of the Invention

The present invention relates to an image display device for forming an image on an image carrier such as a photosensitive belt or an insulated drum. More particularly, the present invention relates to an image display device which visually displays the operation output or image data in the form of electrical signals from a computer or an image reader, or image data stored on a magnetic tape or the like.

2. Description of the Prior Art

As an image display device for visually displaying image data in the form of electrical signals, a CRT (cathode-ray tube) display device or a liquid crystal device is conventionally known.

Of these types of display devices, a CRT display device is more frequently used and has a higher reliability. However, due to the limited resolution, small character such as those found in newspapers or magazines, or characters having a large number of strokes, such as kanjis, cannot be displayed. Such characters are generally enlarged for easy reading. However, with an increase in the multiplication factor, the number of characters which may be displayed per unit area is decreased, resulting in a small amount of data which may be displayed per screen. When the same image is displayed for a continuous period of time, the screen is burnt and the display capacity is degraded. When the screen display flickers, eye fatigue is caused. A liquid crystal display device which has been recently developed has low resolution as in the case of a CRT display device. In addition to this, a liquid display device having a large screen is hard to manufacture and is costly.

As an image display device of a third type which is free from such defects, the present applicant has previously proposed an image display device adopting the electrophotographic method (Japanese Patent Application Nos. 56-197410 to 56-197413). This display device displays image data as toner image; it has a high resolution and reliability and allows easy observation. A display device of this type having a relatively large size is easy to manufacture at relatively low cost.

However, an image display device of this type which adopts the electrophotographic method forms an image by depositing toner on a belt-like photosensitive body, and displays the toner image. A device of this type does not involve electric image display. Therefore, even if the display image is no longer required, the display image remains displayed even after the power supply is turned off. For this reason, the remaining image may be seen by a person other than the operator, which is a problem when the image data is confidential. Furthermore, in this device, a toner image is visualized when a photosensitive body with a toner image formed thereon is exposed to external light. Thus, a physical difference (potential difference) is established between the portion of the photosensitive body which is covered with the toner image and the portion of the photosensitive body which is exposed to the external light. When this state is maintained for a long period of time, the next image forming process is adversely affected resulting in an irregular image or the like.

SUMMARY OF THE INVENTION

It is an object of the present invention to eliminate the problems as described above.

It is another object of the present invention to provide an image display device which can form an excellent image.

It is still another object of the present invention to provide an image display device which allows protection of confidential data.

It is still another object of the present invention to provide an image display device which has an automatic screen erasing means for erasing a screen display after a predetermined period of time even if the operator forgets to erase a screen display, so that confidential data may be protected and any adverse effect of a current display image on the next image forming process may be eliminated.

It is still another object of the present invention to provide an image display device which can redisplay an image within a predetermined period of time since the erasure of the image, so that confidential data may be protected and any adverse effect of a current display image on the next image forming process may be eliminated.

It is still another object of the present invention to provide an image display device which has an image erasing means for turning off a power supply after a screen display on an image carrier is erased in accordance with a turning off of a power supply switch, so that confidential data may be protected and any adverse effect of a current display image on the next image forming process may be eliminated.

The other objects and advantages of the present invention will become apparent from the following description of the invention in conjunction with the accompanying drawings and from the appended claims.

DETAILED DESCRIPTION OF THE PREFERRED EMBODIMENTS

The present invention will now be described in detail with reference to the accompanying drawings.

Figure 1:
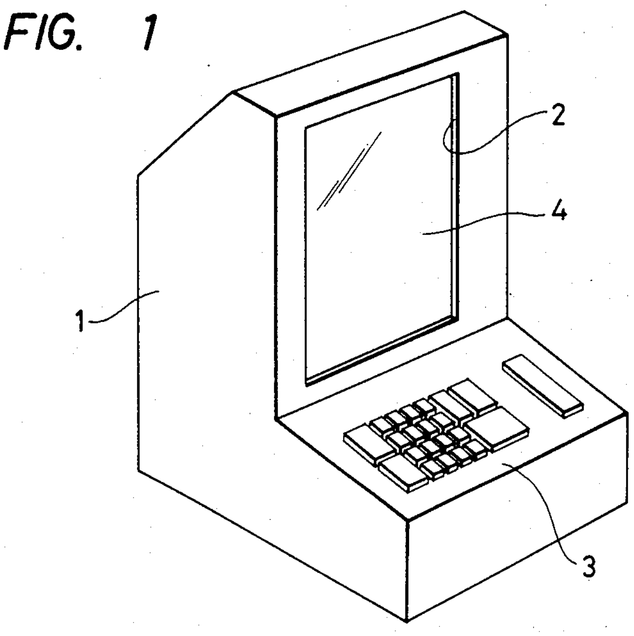
FIG. 1 is a perspective view showing the outer appearance of an image display device according to one embodiment of the present invention.
Figure 2:
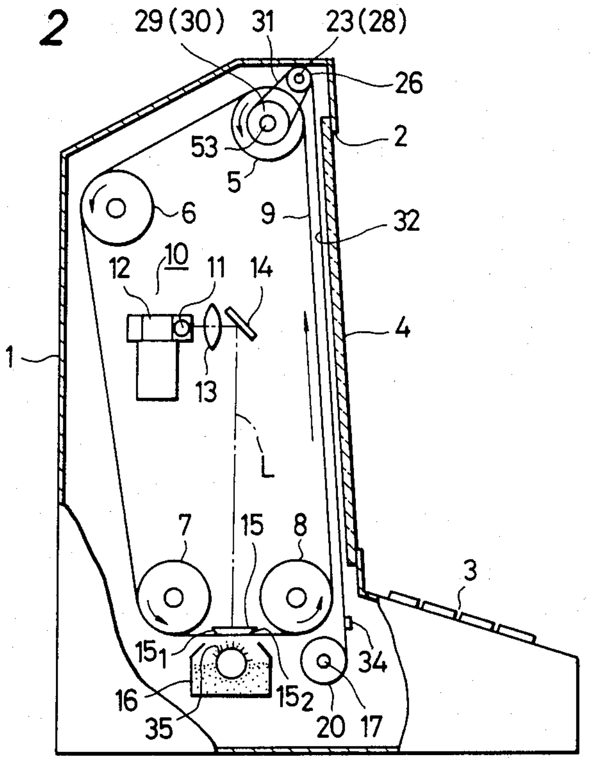
FIG. 2 is a sectional view showing the internal configuration of the device shown in FIG. 1.

FIGS. 1 and 2 show an image display device according to an embodiment of the present invention. An image display window 2 opens at the front side of a vertical-type casing 1. A control panel 3 is arranged on the top surface of a portion of the casing 1 which projects toward the front at the lower portion of the casing 1. A display window glass plate 4 is fitted in the window 2. Support rollers 5 and 6 and support rollers 7 and 8 are arranged at the upper and lower portions, respectively, inside the casing 1, with their axes extending along the transverse direction of the casing 1. The rollers 5 to 8 are individually supported to rotate freely and support therearound an endless belt-like photosensitive body 9.

The endless belt-like photosensitive body (to be referred to as a belt for brevity hereinafter) 9 comprises a base layer consisting of a transparent sheet such as a polyester sheet, and a photosensitive layer (photoconductive layer) such as a CdS layer formed on the outer surface of the base layer with a thin metal film deposited therebetween for rendering electric conductivity to the belt 9 while maintaining the belt 9 substantially transparent. The overall belt 9 is flexible and is looped around the support rollers 5 to 8 such that the photosensitive layer faces outward.

Figure 3:
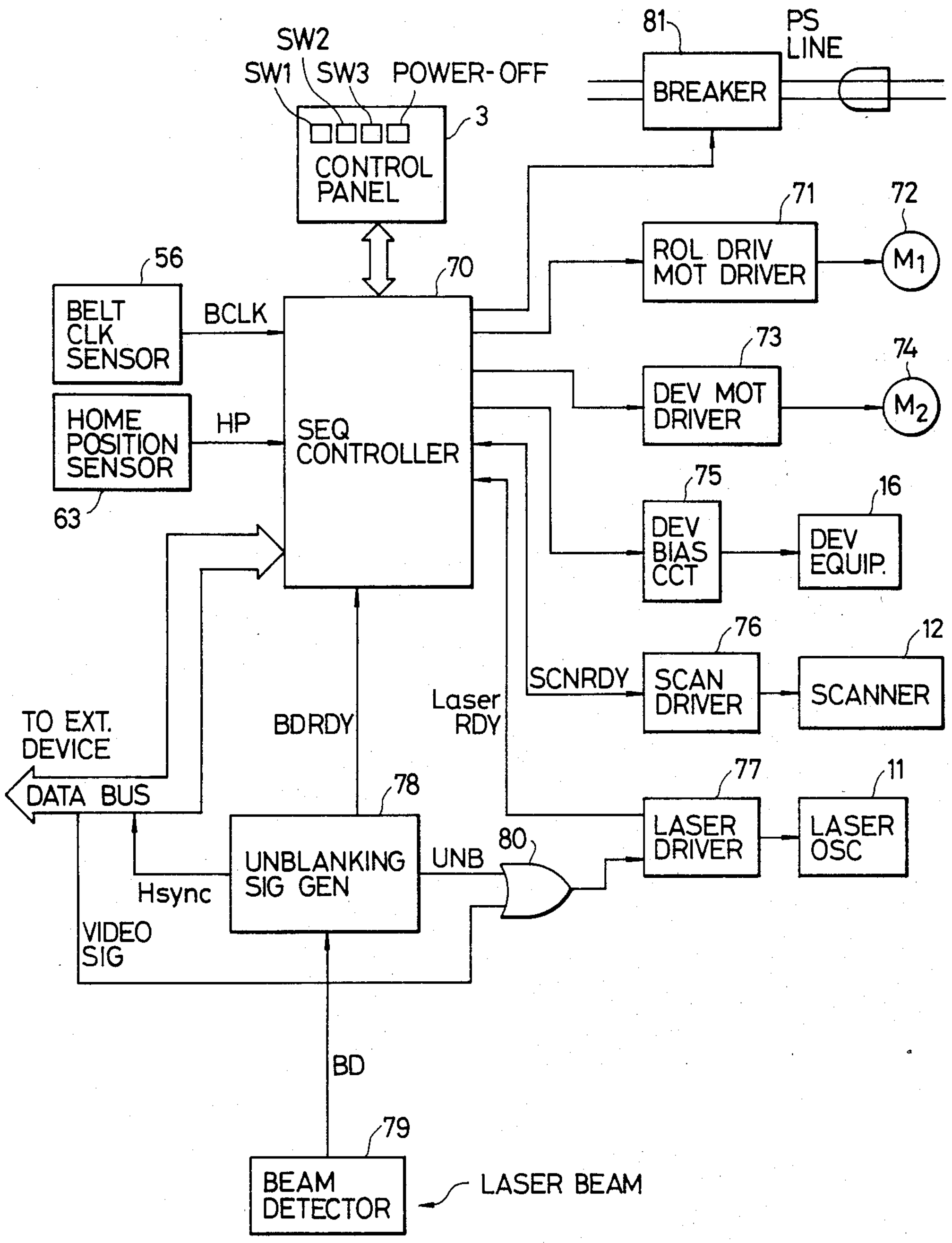
FIG. 3 is a block diagram showing an example of a control section of the device shown in FIG. 1.

Of the four rollers 5 to 8, the roller 5 is used as a drive roller which transmits power from a motor $M_1$ (shown in FIG. 3). One of the remaining rollers 6 to 8, for example, the roller 6 serves as a belt tension roller to provide a suitable tension to the belt 9. When the drive roller 5 is driven counterclockwise (FIG. 2) by the motor $M_1$, the belt 9 is rotated without causing waving, loosening or slippage. Then, the outer surface of the belt 9 moved vertically upward behind the image display window 2.

An image exposure unit 10 of the laser scanning type is arranged at a predetermined position in the space defined within the belt 9. The unit 10 has a semiconductor laser oscillator 11, a polygonal mirror scanner 12, an $f\theta$ lens (imaging lens) 13, a reflecting mirror 14 and a transparent plate 15. The transparent plate 15 may be made of glass or plastic which is elongated along the transverse direction of the casing 1 and which is urged with a suitable pressure against the portion of the inner surface of the belt 9 which is between the support rollers 7 and 8.

In the image exposure unit 10, an intermittent laser beam L corresponding to a time series of electric pixel signals supplied from a computer or an image reader is oscillated from the laser oscillator 11 toward the rotating polygonal mirror scanner 12. The laser beam L incident on the scanner 12 is scanned along the widthwise direction of the belt. The laser beam L then becomes incident on the inner surface portion of the belt 9 between the rollers 7 and 8 through a path of the $f\theta$ lens 13, the reflecting mirror 14, and the transparent plate 15, thereby sanning the laser beam along the widthwise direction of the belt. Thus, image exposure from the inside of the belt with a laser beam is performed in accordance with the above scanning as main scanning and the rotation of the belt 9 as subscanning.

Toner developing equipment 16 is arranged outside the portion of the belt 9 which is between the rollers 7 and 8. The transparent plate 15 is lightly urged against the inner surface of the belt 9 by arranging the lower surface of the plate 15 slightly lower than the common tangent to the lower surfaces of the rollers 7 and 8. End faces $\mathbf{15_1}$ and $\mathbf{15_2}$ of the plate 15 which are at the inlet and outlet side of the belt 9 are chamfered for smooth rotation of the belt 9. The transparent plate 15 serves to prevent waving or vertical shifting of the belt 9 caused upon its contact with a magnet-type developing brush 35 of the developing equipment 16. Thus, the plate 15 serves to hold the exposure position constant so as to improve the resolution of the image.

When various buttons on the control panel 3 are operated to perform the necessary operations such as retrieval of image data or designation of the image display location, and then a display start instruction is keyed in, the belt 9 as a photosensitive body starts rotating at a predetermined speed. Subsequently, a laser beam carrying the designated image data is scanned to expose the inner surface portion of the belt 9 which is between the rollers 7 and 8. Simultaneously as this exposure process, the toner from the developing equipment 16 is applied on the outer surface of the belt 9 so as to sequentially form on the outer surface of the belt 9 a toner image corresponding to the exposed image. As the belt 9 is rotated, the toner image formed on the outer surface of the belt 9 is moved vertically upward to a predetermined window position to be observed through the image display window 2, and the rotation of the belt 9 is terminated. Thus, the image is displayed through the window 2, which can be observed through the glass plate 4. When the belt 9 is rotated again by a belt rerotation instruction signal, the next image is moved to the predetermined window position for display. The toner image on the outer surface of the belt 9 which has been displayed through the window 2 reaches the toner developing equipment 16 as the belt 9 rotates. The toner image is cleaned with the developing brush 35 and is then exposed and developed again with another new image, thereby forming the next toner image. In this manner, in the image display device of the present invention, the image data is displayed in the form of a toner image and exposure of such a toner image is performed with a finely converged laser beam L. Accordingly, image display can be performed with high resolution allowing clear display of small characters or details of other types of images. Furthermore, since the simultaneous exposure/toner application method is adopted, a high-reliability image display device can be provided which has a simple structure which does not require a corona charge means or a special cleaning means, allows a large screen to be made at relatively low cost, and is free from a failure or degradation in the photosensitive body.

FIG. 3 shows an example of a configuration of a control section of the device shown in FIG. 1. A sequence controller 70 recognizes various instruction signals from the operator in accordance with the input signals from the control panel 3 which instruct start of display operation or designation of display page. Based on the recognition result, the sequence controller 7 performs predetermined control. In the control panel 3, there are provided switches for instructing retrieval of image data or designation of the display location, switches SW1 to SW3 for designating various modes, and switches for turning on and off the power supply. The switch SW1 is for instructing erasure of the image formed on the belt 9. The switch SW2 is for indicating to the sequence controller 70 that the operator is utilizing the image formed on the belt 9. The switch SW3 is for instructing a half revolution in the reverse direction of the belt 9. A power supply turn-off switch Power-OFF is for cutting off the power supply through the sequence controller 70. A driver 71 is for a roller drive motor ($M_1$) 72 for driving the belt 9. A driver 73 is for a developing motor ($M_2$) 74 for driving the developing sleeve or brush 35. A developing bias circuit 75 supplies a developing bias voltage of +200 V to +300 V to the developing equipment 16. The ON/OFF states of the drivers 71 and 73 and the bias circuit 75 are controlled in accordance with control signals from the sequence controller 70. As the belt 9 rotates, a belt clock sensor 56 generates a series of clock pulses. In this embodiment, the belt clock sensor 56 comprises, for example, a photoencoder which is directly mounted on a drive shaft 53 (FIG. 2) of the drive roller 5. As is well known, the photoencoder comprises a disc-shaped light-shielding plate with holes, and a photointerrupter. A home position sensor 63 generates a signal corresponding to each page as a home position detecting means and similarly comprises a photoencoder. An output signal BCLK from the belt clock sensor 56 and an output signal HP from the home position sensor 63 are supplied as position detection signals of the belt 9 to the sequence controller 70. In response to the signals BCLK and HP, the sequence controller 70 determines the proper driving timings of the drivers 71 and 73 and the bias circuit 75. The output signal HP at this time represents the reference position of the display page such as a leading edge thereof. If it is assumed that the light-shielding plate of the sensor 63 rotates once per revolution of the belt 9 and data of to pages can be stored on the belt 9, two holes are formed at equal intervals in the light-shielding plate, so that two output signals HP are generated upon each revolution of the light-shielding plate.

A scanner driver 76 drives the scanner 12 for scanning the laser beam L from the laser oscillator 11 in the main scanning direction. The scanner driver 76 supplies to the sequence controller 70 a signal SCNRDY which represents if the scanner 12 is rotating at a predetermined speed. A laser driver 77 drives the laser oscillator 11 and supplies to the sequence controller 70 a signal Laser RDY representing if there is any abnormality such as temperature abnormality.

An unblanking signal generator 78 generates an unblanking signal UNB for producing a laser beam in a non-image area in the main scanning direction. A beam detector 79 detects the laser beam and supplies a laser beam detection signal BD to the unblanking signal generator 78. In response to the detection signal BD from the beam detector 79, the unblanking signal generator 78 generates a sync signal Hsync which is used for synchronizing a video signal in the main scanning direction which is transmitted from external equipment (not shown) such as an image reader or an external memory device. Thus, the unblanking signal UNB and the video signal are together supplied to the laser driver 77 through an OR gate 80. Furthermore, in response to the detection signal BD from the beam detector 79, the unblanking signal generator 78 also performs a detection operation such as detection of asynchronous scanning in the main scanning direction. A corresponding signal BDRDY from the unblanking signal generator 78 is supplied to the sequence controller 70.

A communication interface signal for communication with external equipment is also supplied to the sequence controller 70 such that instructions or data may be exchanged with the external equipment.

A breaker 81 cuts off the power supply of the device in response to a power off instruction signal which is supplied from the sequence controller 70 in response to a power ON release signal supplied upon depression of the switch Power-OFF of the control panel 3.

Figure 4A:
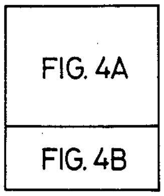
FIG. 4 composed of FIGS. 4A and 4B, FIG. 5 and FIG. 6 composed of FIGS. 6A and 6B are flow charts for showing the sequence of operation of the control section shown in FIG. 3, respectively.
Figure 4:
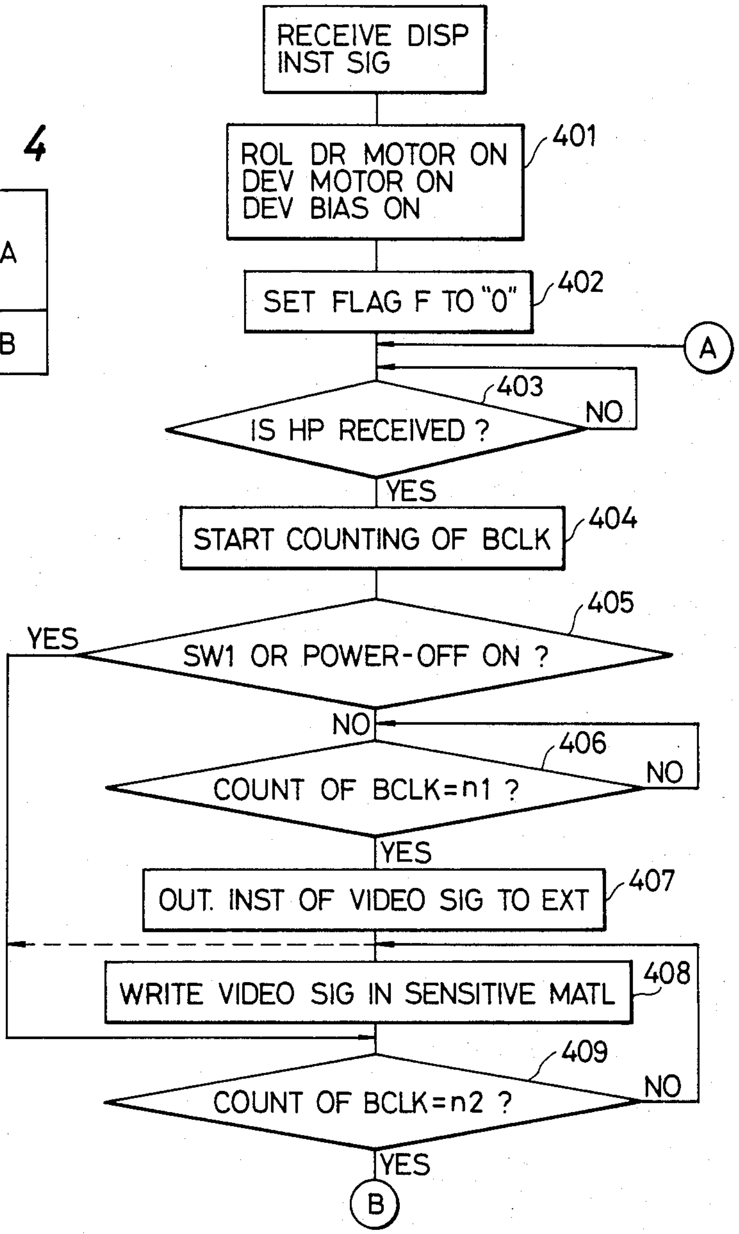
Figure 4B:
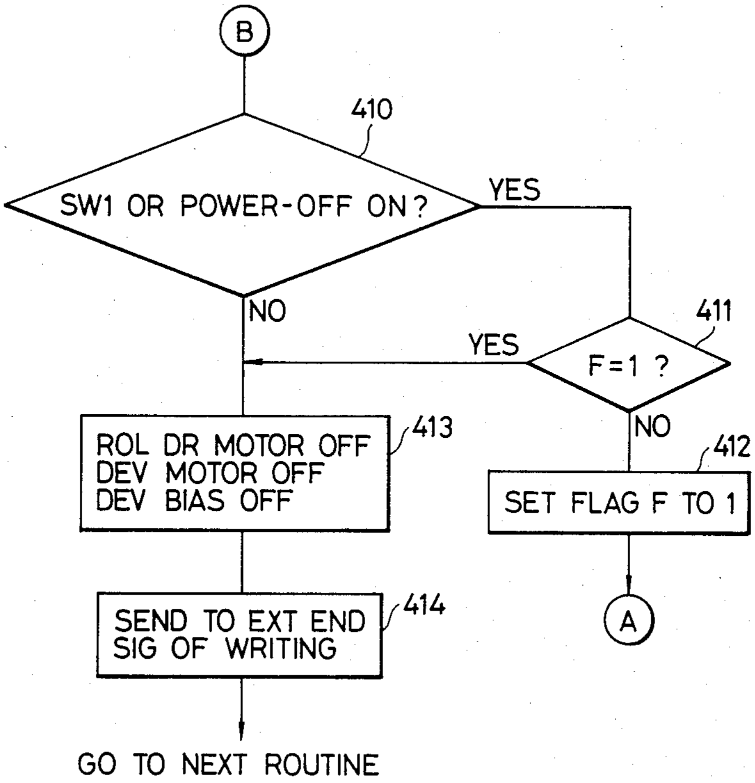

FIG. 4 is a flow chart showing a subroutine showing the sequence of operation of the device shown in FIG. 3 when an image display instruction signal is generated. When an image retrieval instruction signal is supplied from the control panel 3, the motors 72 and 74 and the developing bias voltage are turned on (step 401). Thereafter, the flag F in the sequence controller 70 which is used for discriminating between a half revolution and one revolution of the belt 9 is set to "0" (step 402). When it is determined in step 403 that a home position signal HP is generated in response to rotation of the belt 9, the number of pulses of the belt clock signal BCLK is counted (step 404). If it is determined in step 405 that neither of the switch SW1 or the switch Power-OFF is ON (NO in step 405), it is waited (step 406) until the count of the belt clock signal BCLK reaches a predetermined value n1 which represents the reference image write position.

When the count of the belt clock signal BCLK has reached the predetermined number n1, an output instruction for the video signal is generated (step 407). The received video signal is written (step 408) on the photosensitive belt. Subseqnently, counting of the belt clock signal BCLK and image write are performed until the count of the belt clock signal BCLK reaches another predetermined value n2 which represents an image write end position. When it is determined in step 409 that the count of the belt clock signal BCLK has reached the predetermined value n2, writing of the data on the belt 9 is ended.

If it is determined in step 410 that neither of the switch SW1 and Power-OFF is ON (NO in step 410), the rotation of the motors 72 and 74 is stopped and the application of the developing bias voltage is stopped in step 413. A write end signal (end signal of writing) is supplied to the external equipment (step 414). Then, the flow returns to the main routine shown in FIG. 6. Thus, the instructed image processing is terminated, and a corresponding image is displayed on the belt 9.

On the other hand, if it is determined in step 405 that one of the image erasure switch SW1 and the power supply off switch Power-OFF is depressed (YES in step 405), the flow jumps from step 405 to step 409. Then, step 408 is repeated until it is determined in step 409 that the count of the belt clock signal BCLK equals the predetermined value n2. In this case, since an output of the video signal is not requested to the external equipment, display image erasure of one page on the belt 9 is performed by the write processing in step 408. Since the number of image display pages is set to be 2 in this example, the flow advances from step 410 to 411 wherein it is discriminated if the flag F is set at "1". If NO in step 411, it is determined that the display image erasure on the entire surface of the belt 9 has not been completed. Then, after the flag F is reset to "1", the flow returns to step 403 to repeat the processing as described above. In the next processing, since it is determined in step 411 that the flag F is set to "1" (YES in step 411), it is determined that the belt 9 has rotated once and the flow advances to step 413. After performing step 414, the flow returns to the main routine shown in FIG. 6 to be described later. In this manner, belt one-revolution image erasure along the entire surface of the belt 9 is completed and display image (for two pages) written on the belt 9 is erased.

After a time period has elapsed as will be described below (YES in step 405), the flow jumps from step 405 to step 409. Until the count of the belt clock signal BCLK reaches the predetermined value n2, the processing of step 408 is performed to form a non-image area of one page. When the count of the belt clock signal BCLK reaches the predetermined value n2 in step 409, the flow advances to step 410. In this case, since the belt 9 need not be rotated once, NO is obtained in step 410. Then, after processing of steps 413 and 414 is performed, the flow returns to the main routine shown in FIG. 6 to be described later. Then, the belt half-revolution non-image area display processing is completed, and the non-image area of the belt 9 is displayed. In other words, the operator can only watch the screen with no image displayed thereon.

Figure 5:
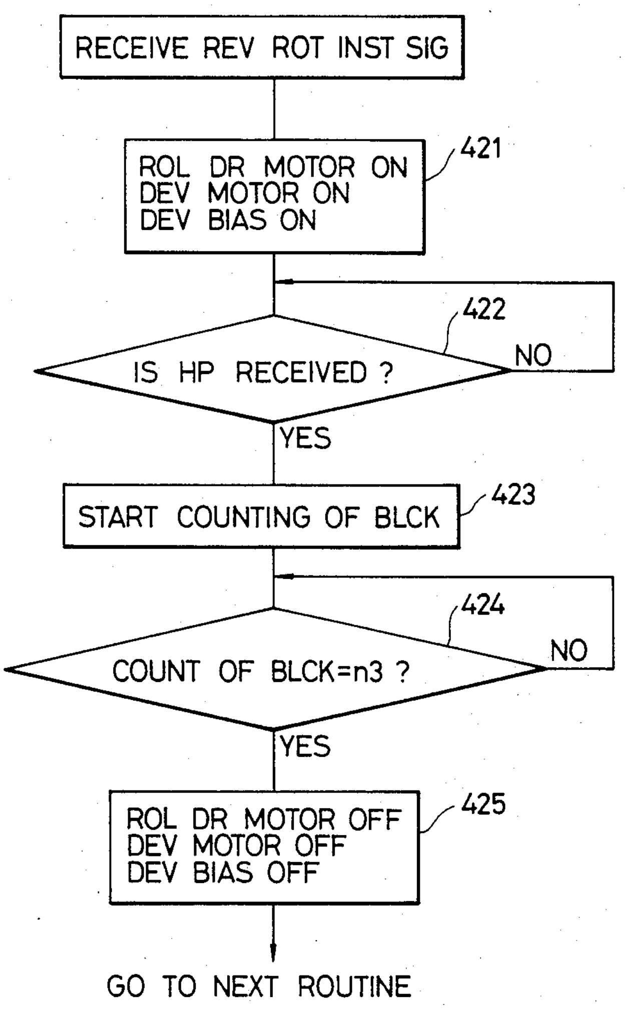

FIG. 5 shows a subroutine of the sequence of operation of the device shown in FIG. 3 when an instruction for rotating the belt 9 a half revolution is generated. When an instruction for reversely rotating the belt 9 a half revolution is received from the control panel 3, the roller drive motor 72 and the developing motor 74 are rotated in the reverse direction, and a developing bias voltage is applied to the developing equipment 16 (step 521). Then, it is discriminated in step 422 whether a home position signal HP is generated. When YES in step 422, counting of the number of pulses of the belt clock signal BCLK is started (step 423).

When it is determined in step 424 that the count of the belt clock signal BCLK reaches a predetermined value n3 which represents a reverse half-revolution position of the belt 9, it is determined that the belt 9 has rotated half a revolution in the reverse direction. Then, the motors 72 and 74 are turned off and the application of the developing bias voltage is stopped (step 425). The flow thus returns to the main routine shown in FIG. 6 to be described later. In this manner, a belt reverse half-revolution image display processing to be described later is completed, and the original image (rear image) is displayed through the image display window 2. Note that the predetermined numbers n2 and n3 hold the following relation:

$$n3 = n - n2$$

where n is the number of pulses of the belt clock pulse BCLK which are generated between the generation timing of the first home position signal HP and the generation timing of the next home position signal HP.

Figure 6B:
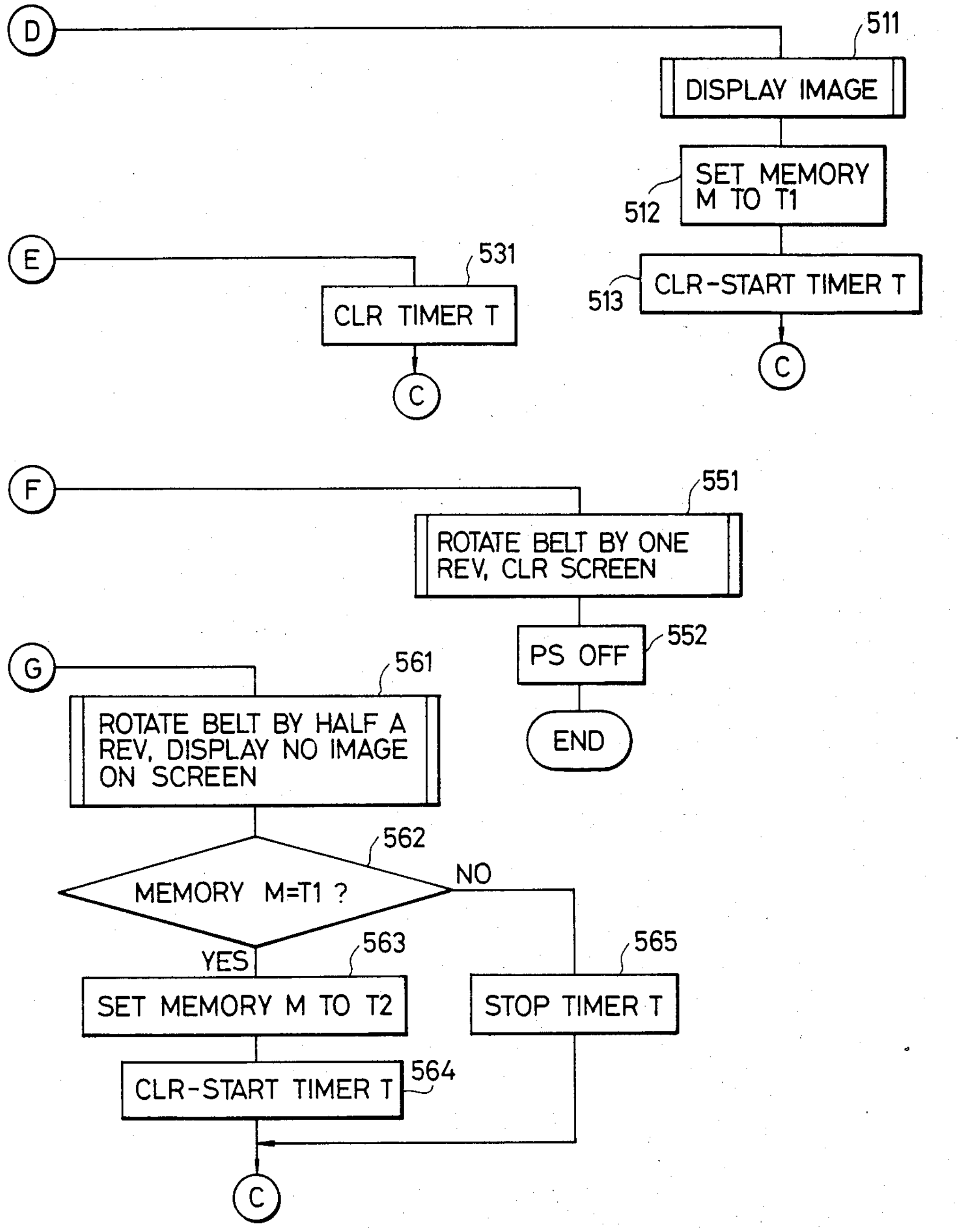

FIG. 6 shows the main routine of the sequence of operation of the device shown in FIG. 3. After power is supplied to the device, the device is initialized (step 501). Next, the flow goes to the main loop of steps 502 to 507 wherein the input from the control panel 3 is monitored. Discriminations are performed in sequential order as follows. It is discriminated in step 502 if there is an image data retrieval instruction signal is generated. It is discriminated in step 503 if the image erasure switch SW1 is ON. It is discriminated in step 504 if the image use switch SW2 is ON. It is discriminated in step 505 if the reverse half-revolution switch SW3 is ON. It is discriminated in step 506 if the power supply turn-off switch Power-OFF is ON. It is finally discriminated in step 507 if a timer T in the sequence controller 70 has exceeded the time period set in a memory M. If NO in all of these steps, the flow returns to step 502, and these steps are repeated until YES is obtained in one of these steps. When an image display instruction is received from the control panel 3 (YES in step 502), the subroutine shown in FIG. 4 is executed (step 511). After a predetermined time T1 is set in the memory M of the sequence controller 70 (step 512), the timer T is cleared and counting is started (to be referred to as a clear start hereinafter; step 513). Then, the flow returns to step 502 of the main loop. In this state, the image remains displayed.

When the image erasure switch SW1 is depressed (YES in step 503), the processing of steps 403 to 409 in the subroutine shown in FIG. 4 is executed twice so as to erase the entire display image on the belt 9 during one revolution thereof (step 521). After stopping counting with the timer T (step 522), the flow returns to step 502 of the main loop. In this state, no image is formed on the belt 9.

When the image use switch SW2 is depressed (YES in step 504), if the timer T is operative, it is clear started. If the timer T is inoperative, it is cleared and remains cleared (step 531). The flow then returns to step 502 of the main loop to monitor the input from the control panel 3.

When the reverse half-revolution switch SW3 is depressed (YES in step 505), the subroutine shown in FIG. 5 is executed to perform a reverse half revolution of the belt 9 so as to display the image of the immediately previous page formed on the belt 9 (step 541). Thereafter, the predetermined time T1 is set in the memory M (step 542), the timer T is cleared and started (step 543), and the flow returns to step 502 of the main loop.

When the power supply turn-off switch Power-OFF is depressed (YES in step 506), the subroutine shown in FIG. 4 is executed to perform one revolution of the belt 9. All the image data on the belt 9 is erased (step 551), and the power is cut off by the breaker 81 (step 552).

When the time of the timer T has exceeded the time set in the memory M (YES in step 507), the subroutine shown in FIG. 4 is executed. The belt 9 is rotated a half revolution to display a non-display area (step 561). When it is determined in step 562 that the content of the memory M is T1 (YES in step 562), the content of the memory M is updated to T2 in step 563. The timer T is then cleared and started again in step 564, and the flow returns to step 502 of the main loop. Accordingly, after time T1 elapses from the image display, the image of one page is erased. After time T2 elapses from this time, the image of the remaining one page is erased. On the other hand, when it is determined in step 562 that the content of the memory M is not T1 (the content thereof is T2; NO in step 562), the timer T is stopped (step 565), and the flow returns to step 502 of the main loop. Immediately before the time of the timer T reaches the time set in the memory M, the operator is signalled with light or sound (not shown) that the time-up is near. When the operator depresses the switch SW2 this time, the timer T restarts counting from the beginning.

In this embodiment, the image display of two pages is performed upon one revolution of the belt. However, image display of three or more pages can also be performed. In this case, the "belt half-revolution" in the above description must be replaced by "several revolutions of the belt per page" (see steps 541 and 561).

In the above embodiment, after the time T1 elapses, the belt is rotated a half revolution to display the non-image area. After the time T2 elapses thereafter, the belt is rotated another half revolution to erase the entire image thereon.

Figure 7:
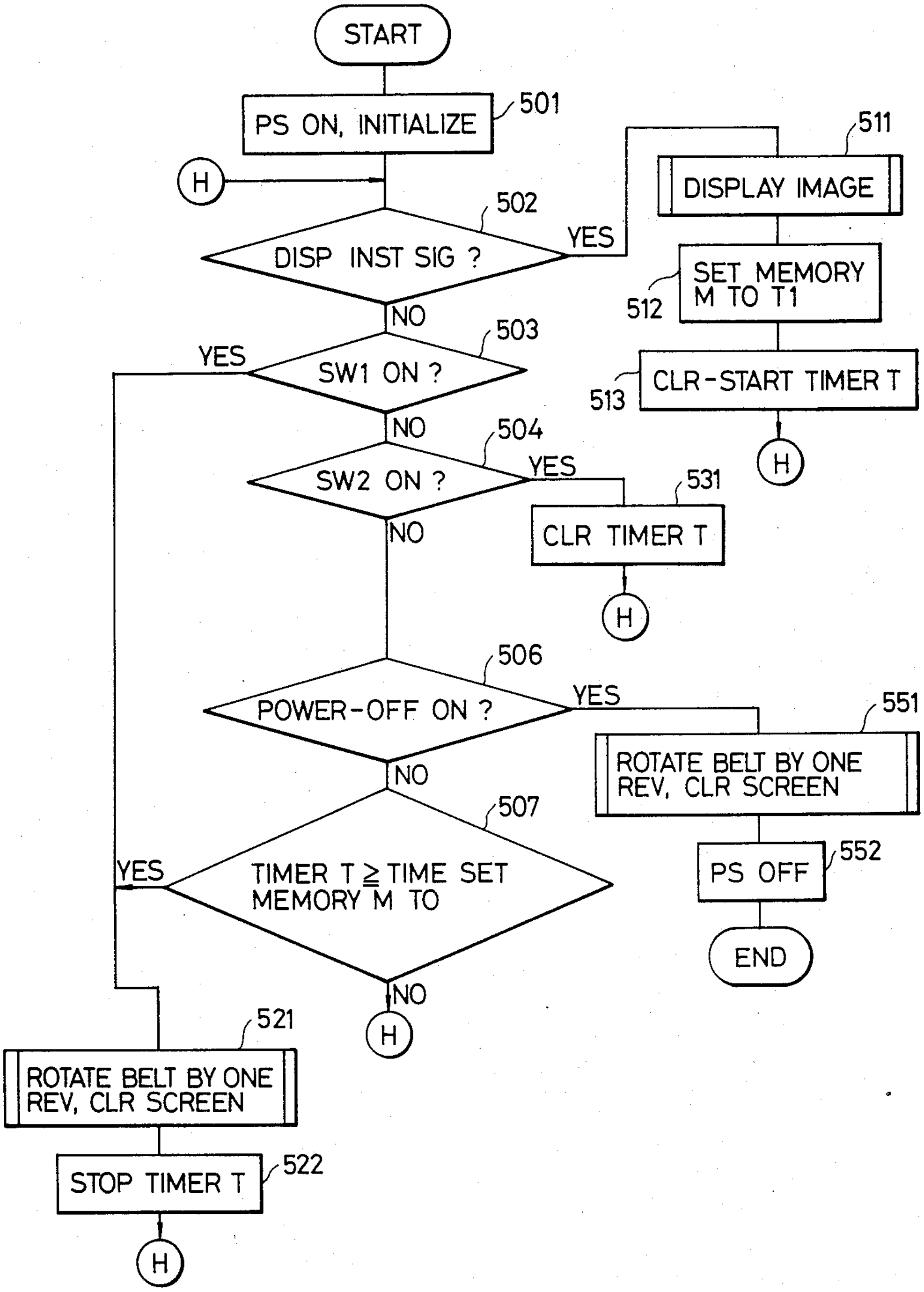
FIG. 7 is a flow chart showing a sequence of operation of an image display device according to another embodiment of the present invention.

However, the entire image on the belt may be erased after the time T1 elapses. FIG. 7 shows a flow chart of sequence of operation of the device in this case. Since the steps in FIG. 7 are identical to those in FIG. 6, a description thereof will be omitted.

In summary, according to the present invention, in an image display device for forming an image on an image carrier, when time for displaying a single image reaches a predetermined time, an automatic image erasing means erases the image, so that the image may not be displayed over a long period of time, confidential data may be protected, and an adverse effect of the current image forming process to the next image forming process may be eliminated.

Furthermore, according to the present invention, in an image display device for forming an image on an image carrier, when time for displaying a single image exceeds a predetermined time, the image carrier is revolved to display a non-image area, so that when the non-image area is displayed, the previous image remains on the image carrier. When another predetermined time elapses after display of the non-display area, the image on the image carrier is erased, so that the same image may not be displayed over a long period of time. Accordingly, confidential data may be protected, and any adverse effect of the current image forming process on the next image forming process may be eliminated. Furthermore, within a predetermined time, the previous image may be redisplayed if necessary.

According to the device of the present invention, means is provided for erasing a display image in accordance with the OFF state of a power switch before the actual turning off of the power supply. Accordingly, after operation of the device, simple turning off of the power supply switch can assure protection of the confidential data, and an adverse effect of the current image forming process to the next image forming process may be eliminated.

In the above embodiment, a photosensitive body as an image carrier is rotated, and an exposure means and a developing means are fixed in position. However, a photosensitive body as an image carrier may be fixed in position, and the exposure means and the developing means may be movable.

A means for erasing a toner image on an image carrier such as the above-mentioned photosensitive body or an insulating belt may be different in accordance with the layer configuration of the carrier used or an image formation process of the image carrier adopted and is not limited to that described with reference to the embodiment of the present invention. For example, the toner image can be erased by passing the belt along a developer and/or exposing the belt to uniform light, changing a bias voltage of the devloping equipment, cleaning the toner image on the image carrier with a cleaning brush or a blade, or a combination of these steps. As an image formation process to which the present invention may be adopted in addition to that described above, there are known a process wherein an electrostatic latent image is formed on an insulating belt using a multistylus and is developed, a process wherein a photosignal is supplied to a photosensitive body by means of an LED element so as to form an electrostatic latent image, or the like.

The present invention is not limited to the particular embodiment described above, and various changes and modifications may be made within the spirit and scope of the present invention.

What I claim is:

1. An image display device comprising:

a display section for displaying an image;

image forming means having an image carrier, for forming an image on said image carrier so as to display the image on said display section; and control means for controlling said image forming means, wherein said control means has a non-image area display means for automatically displaying a non-image area at said display section when the same image formed on said image carrier is displayed on said display section over a predetermined period of time.

2. A device according to claim 1, wherein said non-image area display means displays the non-image area at said display section by erasing the image.

3. A device according to claim 1, wherein said non-image area display means displays the non-image area at said display section by using a non-image area of said image carrier.

4. A device according to claim 2, wherein said non-image area display means erases the image by rotating said image carrier at least once.

5. An image display device comprising:

a display section for displaying an image;

image forming means having an image carrier, for forming an image on said image carrier so as to display the image on said display section; and control means for controlling said image forming means, wherein said control means performs different control operations depending upon whether the same image is on said image carrier for a first predetermined period of time or for a second predetermined period of time.

6. A device according to claim 5, wherein said control means has non-image area display means for displaying a non-image area of said image carrier at said display section when the same image is displayed at said display section over the first predetermined period of time.

7. A device according to claim 5, wherein said control means has erase means for erasing the image when the same image is on said image carrier over the second predetermined period of time.

8. A device according to claim 6, wherein said control means has erase means for erasing the image when the same image is on said image carrier over the second predetermined period of time.

9. A device according to claim 6, further comprising image restore means, and said non-image area display means redisplays the same image in response to an output from said image restore means.

10. An image display device comprising:

a power supply switch for turning off a power supply;

image forming means having an image carrier, for forming an erasable image on said image carrier so as to display the image; and control means for controlling said image forming means, wherein said control means turns off said power supply after erasing the image on said image carrier when said power supply switch is turned off.

* * * * *